United States Patent Office 2,970,143
Patented Jan. 31, 1961

2,970,143
9α-ALKYL STEROIDS AND THEIR METHOD OF PREPARATION

Gordon H. Thomas, New Brunswick, and Josef Fried, Princeton, N.J., assignors to Olin Mathieson Chemical Corporation, New York, N.Y., a corporation of Virginia No Drawing. Filed Nov. 18, 1957, Ser. No. 696,903

16 Claims. (Cl. 260—239.55)

This invention relates to the synthesis of steroids, and has for its object the provision of a new class of physiologically active steroids, which may be represented by the formula

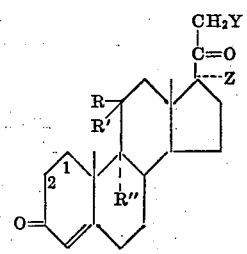

wherein the 1,2-position is saturated or double-bonded, R is hydrogen, R' is α-hydroxy, α-acyloxy, or β-hydroxy, or together R and R' is keto, R'' is lower alkyl (preferably methyl), Y is hydrogen, hydroxy or acyloxy, and Z is hydrogen or α-hydroxy.

The new steroids of this invention are prepared by interacting an organometal reagent with a 3,20-diketal of 9α-fluoro-11-ketoprogesterone; 9α-fluoro-Δ$^{1,4}$-pregnadiene-3,11,20-trione; 9α-fluorocortisone or a 21-ester thereof; 9α-fluoro-prednisone or a 21-ester thereof; 9α-fluoro-11-keto-17α-hydroxy-progesterone; 9α-fluoro-Δ$^{1,4}$-pregnadiene-17α-ol-3,11,20-trione; 9α-fluoro-11-dehydrocorticosterone or a 21-ester thereof; and 9α-fluoro-Δ$^{1,4}$-pregnadiene-21-ol-3,11,20-trione or a 21-ester thereof; thereby yielding the corresponding 3,20-diketal wherein the 9α-fluoro radical is replaced with a lower alkyl group. The resulting diketal can then be hydrolyzed in the usual manner to give the free 3,11,20-triketone; or reduced to yield the corresponding 11-hydroxy derivatives. If the reduction is carried out with a reducing agent such as lithium aluminum hydride, the 11β-hydroxy derivative is obtained as the major product. If, on the other hand, the reduction is done by means of a reducing agent such as lithium metal in liquid ammonia, the 11α-hydroxy derivative is recovered. Both of these 11-hydroxy derivatives can then be hydrolyzed in the usual manner to yield the respective 3,20-diketone derivatives. The resulting 9α-methyl-11α-hydroxy steroids can then, if desired, be acylated in the usual manner, as by treatment with the acid anhydride or acyl halide of the desired acid, to yield the corresponding 11α-acyloxy derivative.

This series of steps is illustrated by the following equations wherein the 3,20-bis-ethylene ketals of 9α-fluorocortisone and 9α-fluoro-11-ketoprogesterone are employed as starting materials:

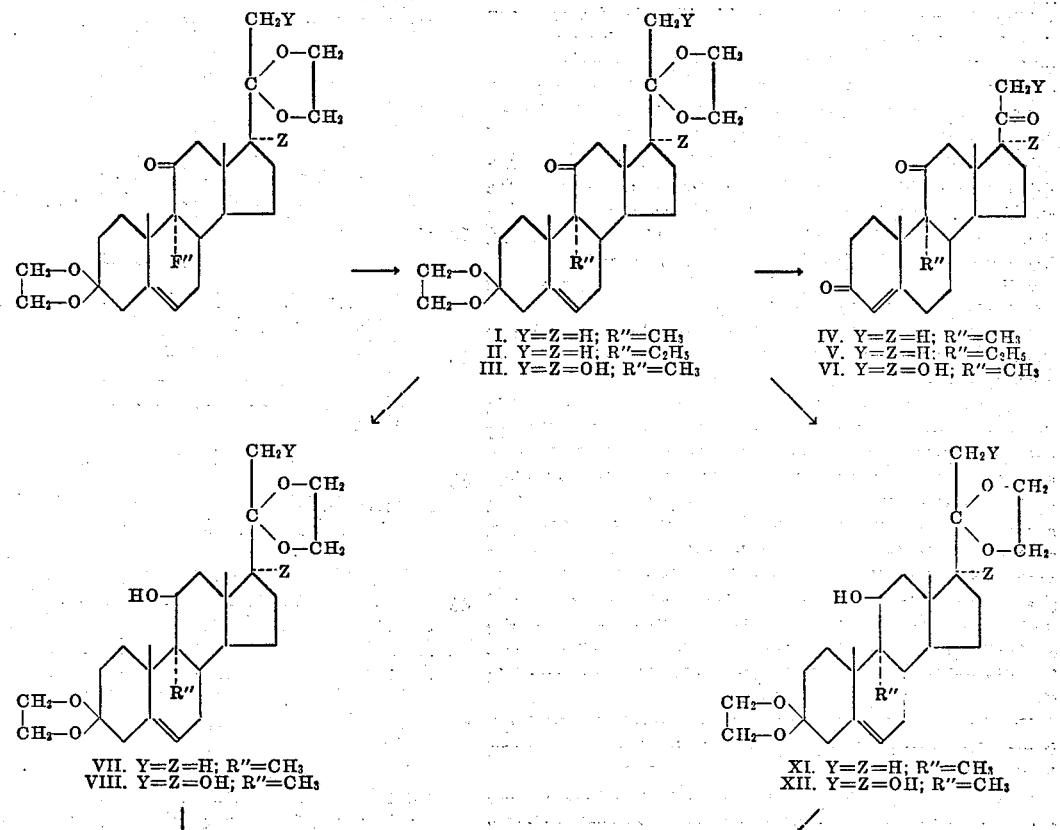

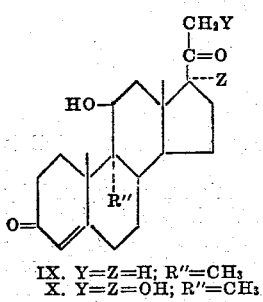
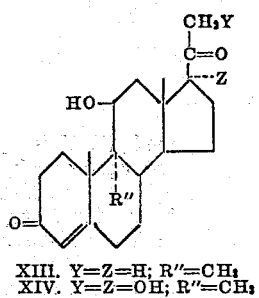
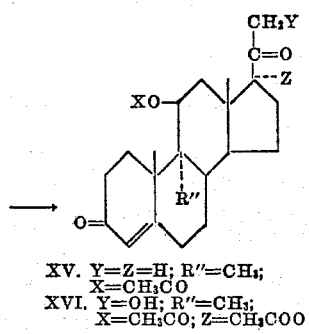

IX. Y=Z=H; R''=CH₃
X. Y=Z=OH; R''=CH₃

XIII. Y=Z=H; R''=CH₃
XIV. Y=Z=OH; R''=CH₃

XV. Y=Z=H; R''=CH₃;
X=CH₃CO
XVI. Y=OH; R''=CH₃;
X=CH₃CO; Z=CH₃COO

As suitable starting materials for the process of this invention may be mentioned any 3,20-diketal of the steroids listed hereinbefore, as exemplified by the diketals with 1,2 or 1,3-dihydric alcohols such as ethylene glycol and propylene glycol. These diketals are then reacted with an organometal. If a Grignard reagent (i.e. a lower alkyl magnesium halide), such as methyl magnesium bromide or iodide or ethyl magnesium bromide or iodide, is employed as the reactant, then in all instances a 9α-lower alkyl derivative is obtained. If, however, a lithium lower alkyl is used as the alkylating agent and the steroid reactant is a progesterone (Y and Z are hydrogen), a 12α-lower alkyl derivative is obtained. In all but the progesterone series (i.e. Y or Z or both are hydroxy or acyloxy), however, a lithium lower alkyl (e.g. lithium methyl) also yields a 9α-lower alkyl derivative. In either event the reaction is preferably conducted in an inert organic solvent for the steroid at any normal temperature, such as ambient temperature. The reaction results in a mixture of two products, one of which is the desired 3,20-diketal of the 9α-methyl-11-keto steroid, and the other is the 3,20-diketal of the 11α-methyl-9β,11β-oxido steroid. The products can be separated by fractional crystallization.

The 9α-methyl-11-keto steroid diketals formed can then be hydrolyzed in the usual manner, as by treatment with a dilute aqueous acid at an elevated temperature, to yield the corresponding 3,11,20-triketone derivatives.

The 9α-methyl-11-keto steroid diketals can also be reduced to the corresponding 11-hydroxy derivatives. If this reduction is done by means of lithium aluminum hydride, preferably at an elevated temperature with the steroid reactant in solution, the corresponding 11β-hydroxy derivative is obtained as the major product. If, however, the reduction is carried out by means of an alkali metal (e.g. lithium) in liquid ammonia, then the 11α-hydroxy derivatives are formed.

In either event the 11-hydroxy steroid obtained can then be hydrolyzed as described hereinbefore to the free 3,20-diketone.

The 11α-hydroxy derivatives can further be acylated in the usual manner by treatment with an acyl halide or acid anhydride of the desired acid. Particularly preferred are the acyl chlorides or acid anhydrides of hydrocarbon carboxylic acids having less than ten carbon atoms, as exemplified by the lower alkanoic acids (e.g. acetic, propionic, and enanthic acid), the monocyclic aromatic carboxylic acids (e.g., benzoic and toluic acid), the monocyclic aralkanoic acids (e.g. phenacetic and β-phenylpropionic acid), the lower alkenoic acids, the cycloalkane carboxylic acids, and the cycloalkene carboxylic acids. The acylation is preferably conducted in the presence of an organic base, such as pyridine.

Furthermore, if a free 21-hydroxy steroid is obtained, it may be converted to a 21-ester derivative by acylation in the usual manner as described hereinbefore.

The steroids of this invention wherein free keto groups are present in the 3 and 20 positions are physiologically active substances which possess anti-inflammatory activity. Hence, the steroids of this invention can be used in lieu of known anti-inflammatory steroids, such as hydrocortisone, in the treatment of rheumatoid arthritis, being formulated for such administration in the same type of peroral preparations, with concentration and/or dosage based on the activity of the particular compound.

The following examples are illustrative of the invention (all temperatures being in centigrade):

EXAMPLE 1

*9α-methyl-11-ketoprogesterone 3,20-bis-ethylene ketal (I)*

A solution of 1.3 g. of 9α-fluoro-11-ketoprogesterone-3,20-bis-ethylene ketal in 130 ml. of ether is treated with 20 ml. of ethereal methyl magnesium bromide (prepared from 1.3 g. of magnesium and 2.6 ml. of methyl bromide). The solution is stirred for 16 hours at room temperature and then the excess Grignard reagent is decomposed by the addition of ice. Ether (300 ml.) is added and the organic solution is washed with 5% aqueous ammonium chloride and then with water. The dried ether solution is evaporated under reduced pressure to give about 1.1 g. of residue which is taken up in 60 ml. of hexane-benzene (1:2) and absorbed on 30 g. of alumina. Elution with benzene (500 ml.) and with chloroform-benzene (1:99, 200 ml.), followed by three crystallizations from acetone-hexane gives about 30 mg. of 11α-methyl-9β,11β-oxidoprogesterone-3,20-bisethylene ketal, M.P. about 191–193°. Elution of the column with chloroform-benzene (1:9, 200 ml.; 1:4, 200 ml.) followed by crystallization from acetone-hexane gives about 20 mg. of 9α-methyl-11-ketoprogesterone-3,20-bisethylene ketal (I), having melting point 200–204°, $[\alpha]_D+12.2°$ (c. 0.94 in C HCl₃);

$$\lambda_{max.}^{Nujol}\ 5.92$$

*Analysis.*—Calcd. for $C_{26}H_{38}O_5$ (430.56): C, 72.52; H, 8.90. Found: C, 72.60; H, 8.88.

Similarly, if ethyl magnesium bromide is substituted for the methyl magnesium bromide in Example 1, 9α-ethyl-11-ketoprogesterone 3,20-bis-ethylene ketal (II) is obtained.

EXAMPLE 2

*9α-methyl-11-ketoprogesterone 3,20-bis-ethylene ketal (I) and 9α-methyl-11-ketoprogesterone (IV)*

10 g. of 9α-fluoro-11-ketoprogesterone 3,20-bis-ethylene ketal in 200 ml. of benzene is treated with 100 ml. of an ethereal solution of methyl magnesium bromide (prepared from 5 g. of magnesium and 10 ml. of methyl bromide), the solution then being stirred at room temperature overnight. The steroids are isolated with chloroform as described in Example 1, and the resultant product is hydrolyzed by heating in 40 ml. of methanol and 4 ml. of 8% sulfuric acid for 4 hours. Isolation with chloroform followed by trituration of the residue with methanol yields about 260 mg. of the 9α-methyl-11-ketoprogesterone 3,20-bis-ethylene ketal (I) having melting point 213–217°. The methanol mother liquor is evaporated to dryness in vacuo, the residue taken up in 25 ml. of benzene and absorbed on 200 g. of acid-washed alumina. Elution with benzene followed by crystallization from acetone-hexane gives about 130 mg. of a methyl keto steroid of unknown structure having M.P. about 160–168°. Three crystallizations from acetone-hexane affords an analytical sample of this steroid having M.P. 178–180°; $[\alpha]_D + 105°$ (c. 0.98 in $CHCl_3$);

$\lambda_{max.}^{alc}$ 241 (12,600); $\lambda_{max.}^{Nujol}$ 5.86, 6.00, 6.23$\mu$ Analysis.—Calcd. for $C_{22}H_{30}O_3$ (342.46): C, 77.15; H, 8.83. Found: C, 77.11; H, 8.67.

Elution of the column with chloroform-benzene (1:4, 1 l.; 1:1, 1 l.) followed by two crystallizations from acetone-hexane yields about 165 mg. of the 9α-methyl-11-ketoprogesterone (IV), melting at about 210.215.

EXAMPLE 3

9α-methyl-11-ketoprogesterone (IV)

To a solution of 2 g. of 9α-fluoro-11-ketoprogesterone-3,20-bis-ethylene ketal in 50 ml. of benzene is added 10 ml. of an ethereal solution of methyl magnesium bromide (prepared from 1 g. of magnesium and 2 ml. of methyl bromide in 20 ml. of ether) and the solution is stirred at room temperature for 18 hours. The excess Grignard reagent is then decomposed by the careful addition of ice. Chloroform (200 ml.) is added, and the mixture is washed several times with 5% ammonium chloride solution followed by water, and then dried and evaporated in vacuo. A solution of the residue in 50 ml. of methanol and 5 ml. of 8% sulfuric acid is heated under reflux for 4 hours. The mixture is diluted with water and the steroids extracted with chloroform, the chloroform extract then being washed well with water, dried over sodium sulfate and evaporated to dryness in vacuo. Trituration of the residue with ice-cold methanol yields about 215 mg. of 9α-methyl-11-ketoprogesterone (IV), having melting point about 211–218°. Crystallization from chloroform-methanol yields an analytical sample having melting point about 222–224°; $[\alpha]_D + 305°$ (c. 0.94 in $CHCl_3$);

$\lambda_{max.}^{alc}$ 238 m$\mu$ (18,500); $\lambda_{max.}^{Nujol}$ 5.87; 5.99; 6.18$\mu$ Analysis.—Calcd. for $C_{22}H_{30}O_3$ (342.46): C, 77.15; H, 8.83. Found: C, 77.24; H, 8.66.

EXAMPLE 4

9α-methylcortisone 3,20-bis-ethylene ketal (III)

To a solution of 600 mg. of 9α-fluorocortisone-3,20-bis-ethylene ketal in 130 ml. of benzene is added with stirring under nitrogen, 8 ml. of 2.5 molar solution of methyl magnesium bromide in ether (prepared from 1.2 g. of magnesium and 3 ml. of methyl bromide in 20 ml. of ether). The reaction is permitted to proceed for 3 hours at room temperature, after which excess Grignard reagent is decomposed with ice and ammonium chloride solution. After separation of the layers the benzene phase is washed with water, dried over sodium sulfate and evaporated to dryness in vacuo. The amorphous residue (about 621 mg.) upon addition of methanol crystallizes and furnishes crude 9α-methylcortisone-3,20-bisethylene ketal (about 206 mg.) which upon recrystallization from the same solvent furnishes the pure compound, having the following properties: M.P. about 221–227°; $[\alpha]_D^{23} + 2°$ (c. 1.3 in chlf.);

$\lambda_{max.}^{Nujol}$ 2.78, 2.85, 5.85$\mu$

Analysis.—Calcd. for $C_{26}H_{38}O_7$ (462.56): C, 67.51; H, 8.28. Found: C, 67.41; H, 8.19.

EXAMPLE 5

9α-methylcortisone 3,20-bis-ethylene ketal (III) and 11α-methyl 9β,11β-oxido-Δ⁴-pregnene-17,21-diol-3,20-dione 3,20-bis-ethylene ketal.

To an ethereal solution of methyl lithium (prepared from 2.64 g. of lithium and 11 ml. of methyl bromide in 200 ml. of ether) is added 5.51 g. of 9α-fluorocortisone-3,20-bis-ethylene ketal in 1,200 ml. of benzene. The resulting solution is stirred at room temperature for three hours with the exclusion of air. Excess methyl lithium is decomposed by the cautious addition of ice and the benzene layer separated from the aqueous phase. The benzene extract is washed neutral with water, dried over sodium sulfate and evaporated to dryness in vacuo. The amorphous residue crystallizes readily upon addition of methanol. The first crop after 2 recrystallizations from methanol furnishes pure 11α-methyl - 9β,11β - oxido - Δ⁴- pregnene-17α,21-diol-3,20-bis-ethylene ketal (about 550 mg.) of the following properties: M.P. about 199–200°; $[\alpha]_D^{23} + 66°$ (c. 1.0 in chlf.);

$\lambda_{max.}^{Nujol}$ 2.84$\mu$ (no carbonyl bands)

Analysis.—Calcd. for $C_{26}H_{38}O_7$ (462.56): C, 67.51; H, 8.28. Found: C, 67.27; H, 8.23.

Concentration of the mother liquors yields in three consecutive crops material melting at about 218–222° which is identical in all respects with 9α-methylcortisone-3,20-bis-ethylene ketal.

Similarly, by the following the procedure of the foregoing examples, but substituting one of the following: 9α-fluoro-11-dehydrocorticosterone 3,20-bis-ethylene ketal; 9α-fluoro-11-keto-17α-hydroxyprogesterone 3,20-bis-ethylene ketal; 9α-fluoro-Δ¹,⁴-pregnadiene-3,11,20-trione 3,20-bis-ethylene ketal; 9α-fluoro-prednisone 3,20-bis-ethylene ketal; and 9α-fluoro-Δ¹,⁴-pregnadiene-21-ol-3,11,20-trione 3,20-bis-ethylene ketal for the steroid reactants in the examples, one of the following, respectively, is obtained: 9α-methyl-11-dehydrocorticosterone 3,20-bis-ethylene ketal; 9α-methyl-11-keto-17α-hydroxyprogesterone 3,20-bis-ethylene ketal; 9α-methyl-Δ¹,⁴-pregnadiene-3,11,20-trione 3,20-bis-ethylene ketal; 9α-methylprednisone 3,20-bis-ethylene ketal; and 9α-methyl-Δ¹,⁴-pregnadiene-21-ol-3,11,20-trione 3,20-bis-ethylene ketal.

EXAMPLE 6

9α-methyl-11-ketoprogesterone (IV)

A solution of 60 mg. of 9α-methyl-11-ketoprogesterone-3,20-bis-ethylene ketal in 10 ml. of methanol and 1 ml. of 8% sulfuric acid is heated under reflux for 4 hours. The reaction mixture is diluted with water and the steroids extracted with chloroform, the chloroform extract then being washed with water, dried over sodium sulfate and evaporated to dryness in vacuo. Crystallization from acetone-hexane yields about 31 mg. of 9α-methyl-11-ketoprogesterone, having melting point about 221–224° and an infrared spectrum identical with that of the sample described in Example 3.

Similarly, 9α-ethyl-11-ketoprogesterone 3,20-bis-ethylene glycol can be hydrolyzed to 9α-ethyl-11-ketoprogesterone (V).

EXAMPLE 7

9α-methylcortisone (VI)

A solution of 100 mg. of 9α-methylcortisone-3,20-bis-ethylene ketal in 25 ml. of methanol and 1.84 ml. of 8% sulfuric acid is refluxed for 2½ hours. Water is added and the reaction mixture neutralized with dilute sodium bicarbonate solution. After evaporation of the methanol in vacuo the residual suspension is extracted with ethyl acetate and the ethyl acetate extract dried over sodium sulfate. Evaporation of the solvent in vacuo produces a crystalline residue which upon recrystallization from 95% alcohol furnishes pure 9α-methylcortisone of the following properties: M.P. about 266–267° (dec.); $[\alpha]_D^{23}+222°$ (c. 0.31 in 95% ethanol);

$\lambda_{max.}^{alc}$ 238 mμ (ε=16,300); $\lambda_{max.}^{Nujol}$ 2.82, 5.87, 6.02, 6.18μ

Analysis.—Calcd. for $C_{22}H_{30}O_5$ (374.46): C, 70.56; H, 8.08. Found: C, 70.46; H, 7.80.

9α-methylcortisone possesses about ¼ the activity of cortisone acetate in the rat liver glycogen assay.

Similarly, any of the other 3,20-bis-ethylene ketals within the purview of this invention can be hydrolyzed to the free 3,20-diketone derivatives.

EXAMPLE 8

9α-methylcortisone 21-acetate

A solution of 18 mg. of 9α-methylcortisone in 1 ml. pyridine and 0.3 ml. of acetic anhydride is allowed to stand at room temperature for 18 hours. After evaporation of the reagents in vacuo a crystalline residue remains which is recrystallized from acetone-hexane. Pure 9α-methylcortisone acetate has the following properties: M.P. about 258–260° (dec.); $[\alpha]_D^{23}+236°$ (c. 0.75 in chlf.);

$\lambda_{max.}^{alc}$ 239 mμ (ε=17,100); $\lambda_{max.}^{Nujol}$ 3.01, 5.70, 5.78, 5.84, 6.01–6.05, 6.22μ

Analysis.—Calcd. for $C_{24}H_{32}O_6$ (416.50): C, 69.21; H, 7.74. Found: C, 69.04; H, 7.69.

Furthermore, by substituting other acylating agents such as propionic anhydride and benzoyl chloride for the acetic anhydride in the procedure of Example 8, the corresponding 21-propionate and benzoate derivatives are formed. Moreover, all other 21-hydroxy steroids formed can be 21-esterified by the general method of Example 8.

EXAMPLE 9

9α-methyl-11β-hydroxyprogesterone 3,20-bis-ethylene ketal (VII)

A solution of 9α-methyl-11-ketoprogesterone-3,20-bis-ethylene ketal in 100 ml. of freshly dried tetrahydrofuran is refluxed with 1.1 g. of lithium aluminum hydride for 18 hours. The reaction mixture is decomposed by the addition of ice and then a saturated sodium sulfate solution is added until the aluminum salts are formed into a slurry. The clear ether solution is decanted off and the residue is washed twice with chloroform. The combined organic extracts are dried over sodium sulfate and then evaporated to dryness in vacuo. The residue (about 425 mg.; M.P. about 187–190°) is dissolved in 50 ml. of benzene and absorbed on 12 g. of alumina. Elution with benzene and with chloroform:benzene (1:1) followed by crystallization from chloroform-methanol gives 337 mg. of the 11β-hydroxy compound (VII) having M.P. about 194–196°; $[\alpha]_D$ +43.9° (c. 0.97 in CHCl₃);

$\lambda_{max.}^{Nujol}$ 2.86μ

Analysis.—Calcd. for $C_{26}H_{40}O_5$ (432.58): C, 72.19; H, 9.32. Found: C, 71.68; H, 9.34.

EXAMPLE 10

9α-methylhydrocortisone 3,20-bis-ethylene ketal (VIII)

A solution of 4 g. of 9α-methylcortisone 3,20-bis-ethylene ketal in 267 ml. of pure tetrahydrofuran is refluxed with 2 grams of lithium aluminum hydride for 4 hours. After cooling excess lithium aluminum hydride is destroyed by the addition of acetone and after the addition of a saturated sodium sulfate solution the reaction mixture is extracted with chloroform. The chloroform solution is washed with water, dried over sodium sulfate and concentrated to dryness in vacuo.

EXAMPLE 11

9α-methyl-11β-hydroxyprogesterone (IX)

A solution of 9α-methyl-11β-hydroxyprogesterone-3,20-bis-ethylene ketal (315 mg.) in 25 ml. of methanol and 2.5 ml. of 8% sulfuric acid is heated under reflux for one hour. Upon dilution with water, about 207 mg. of 9α-methyl-11β-hydroxyprogesterone is precipitated with melting point about 228–231°. Crystallization from chloroform-methanol gives an analytical sample of 9α-methyl-11β-hydroxyprogesterone melting about 243–244°; $[\alpha]_D+246°$ (c. 1.06 in CHCl₃);

$\lambda_{max.}^{alc}$ 243 mμ (16,200); $\lambda_{max.}^{Nujol}$ 2.82, 2.92, 5.86, 5.91, 5.99, 6.05, 6.20μ; $\lambda_{max.}^{CHCl_3}$ 2.90, 5.86, 6.01, 6.18μ

Analysis.—Calcd. for $C_{22}H_{32}O_3$ (344.48): C, 76.70; H, 9.36. Found: C, 76.28; H, 9.14.

EXAMPLE 12

9α-methylhydrocortison (X)

The crude reduction product (4 g.) obtained in Example 10 containing 9α-methylhydrocortisone 3,20-bis-ethylene ketal is dissolved in 655 ml. of methanol and 22.2 ml. of 8% sulfuric acid. The resulting mixture is refluxed for ¾ of an hour, neutralized with dilute sodium bicarbonate and after the addition of water, the methanol is evaporated in vacuo. The residual suspension is extracted with ethyl acetate, the ethyl acetate extract washed with water, dried over sodium sulfate and evaporated to dryness in vacuo. The residual crystalline material is first recrystallized from acetone-hexane and finally from 95% alcohol. There is obtained about 240 mg. of 9α-methylhydrocortisone of the following properties: M.P. about 258–262° (dec.); $[\alpha]_D^{23}+187°$ (c. 1.24 in 95% ethanol);

$\lambda_{max.}^{alc}$ 2.82, 2.92, 5.86, 6.01, 6.20μ

Analysis.—Calcd. for $C_{22}H_{32}O_5$ (376.48): C, 70.18; H, 8.57. Found: C, 69.91; H, 8.50.

Fractional crystallization of the mother liquors furnishes 9α-methylcortisone, which possesses about twice the activity of cortisone acetate in the rat liver glycogen assay.

EXAMPLE 13

9α-methylhydrocortisone 21-acetate

A solution of 24.4 mg. of 9α-methylhydrocortisone in 0.5 ml. of pyridine and 0.25 ml. of acetic anhydride is allowed to stand at room temperature for 18 hours. Evaporation of the reagents in vacuo furnishes a crystalline residue which after recrystallization from acetone-hexane yields pure 9α-methylhydrocortisone acetate of the following properties: M.P. about 244–245°; $[\alpha]+184°$ (c. 0.24 in chlf.);

$\lambda_{max.}^{alc}$ 243 mμ (ε=17,800); $\lambda_{max.}^{Nujol}$ 2.80, 2.99, 5.72, 5.80, 6.05, 6.20μ

Analysis.—Calcd. for $C_{24}H_{34}O_6$ (418.51): C, 68.87; H, 8.19. Found: C, 68.89; H, 8.20.

EXAMPLE 14

9α-methyl-11α-hydroxyprogesterone 3,20-bis-ethylene ketal (XI)

To a stirred solution of 100 mg. of 9α-methyl-11-ketoprogesterone 3,20-bis-ethylene ketal in 100 ml. of liquid ammonia and 3 ml. of methanol, is added 100 mg. of lithium in small pieces over 15 minutes. The liquid ammonia is allowed to evaporate at room temperature and the residue is triturated with 50 ml. of water. The precipitated solid (about 94 mg., M.P. about 180–185°) is collected, washed with water and dried. Crystallization from acetone-hexane gives an analytical sample of the 11α-hydroxy compound (XI) having M.P. about 190–193°, [α]$_D$ –47° (c. 1.03 in CHCl$_3$);

$\lambda_{max.}^{Nujol}$ 2.85μ

*Analysis.*—Calcd. for C$_{26}$H$_{40}$O$_5$ (432.58): C, 72.19; H, 9.32. Found: C, 72.49; H, 9.14.

EXAMPLE 15

9α-methyl-11-epihydrocortisone 3,20-bis-ethylene ketal (XII)

To a solution of 200 mg. of 9α-methylcortisone-3,20-bis-ethylene ketal in 7 ml. of methanol and 40 ml. of liquid ammonia is added over a ten minute period at −60°, 160 mg. of finely cut lithium. The reaction is allowed to proceed without external cooling until most of the ammonia has evaporated (ca. one hour). Water and chloroform is then added and the chloroform extract washed several times with water until neutral. The chloroform solution is dried over sodium sulfate and evaporated to dryness in vacuo. The residue (about 230 mg.) after recrystallization from acetone gives pure 9α-methyl-11-epihydrocortisone-3,20-bis-ethylene ketal of the following properties: M.P. about 274–276°; [α]$_D^{23}$ −44° (c. 0.56 in chlf.);

$\lambda_{max.}^{Nujol}$ 2.80, 2.87, 2.95 (inflection)

*Analysis.*—Calcd. for C$_{26}$H$_{40}$O$_7$ (464.58): C, 67.21; H, 8.68. Found: C, 67.19; H, 8.66.

EXAMPLE 16

9α-methyl-11α-hydroxyprogesterone (XIII)

A solution of 250 mg. of 9α-methyl-11α-hydroxyprogesterone 3,20-bis-ethylene ketal in 10 ml. of methanol and 1 ml. of 8% sulfuric acid is heated under reflux for 1 hour. The mixture is then diluted with water, the precipitated solid (about 180 mg., M.P. about 201–203°) collected and crystallized from acetone-hexane to give the 11a-hydroxy compound having M.P. about 205–207°; [α]$_D$+193° (c. 1.08 in CHCl$_3$);

$\lambda_{max.}^{Nujol}$ 2.92, 5.90, 5.99, 6.21μ

*Analysis.*—Calcd. for C$_{21}$H$_{30}$O$_3$ (342.46): C, 77.15; H, 8.83. Found: C, 76.51; H, 9.18.

EXAMPLE 17

9α-methyl-11-epihydrocortisone (XIV)

A solution of 100 mg. of 9α-methyl-11-epihydrocortisone-3,20-bis-ethylene ketal in 20 ml. of methanol and 0.68 ml. of 8% sulfuric acid is refluxed for 40 minutes. Water is added and the reaction mixture neutralized with dilute sodium bicarbonate. After evaporation of the methanol in vacuo, the residual suspension is extracted with ethyl acetate and the ethyl acetate solution dried over sodium sulfate. Evaporation of the solvent in vacuo leaves a crystalline residue which after recrystallization from 95% alcohol furnishes the pure 9α-methyl-11-epihydrocortisone of the following properties: M.P. about 245–246°; [α]$_D^{23}$+140° (c. 0.56 in 95% ethanol);

$\lambda_{max.}^{alc.}$ 243 mμ (ε=15,800); $\lambda_{max.}^{Nujol}$ 2.89, 5.85, 6.02, 6.22μ

*Analysis.*—Calcd. for C$_{22}$H$_{32}$O$_5$ (376.48): C, 70.18; H, 8.57. Found: C, 70.11; H, 8.51.

EXAMPLE 18

9α-methyl-11α-hydroxyprogesterone 11α-acetate (XV)

A solution of 15 mg. of 9α-methyl-11α-hydroxyprogesterone in 0.5 ml. pyridine and 0.15 ml. of acetic anhydride is allowed to stand at room temperature for 16 hours. Dilution with ice-water followed by crystallization from acetone-hexane yields a sample of the 11α-acetate (about 9 mg.) having M.P. about 260–262°; [α]$_D$+194° (c. 0.83 in CHCl$_3$);

$\lambda_{max.}^{Nujol}$ 5.78, 5.85, 5.98, 6.20, 8.00μ

EXAMPLE 19

9α-methyl-11α-hydroxyprogesterone 11α-mesylate

A solution of 93 mg. of 9α-methyl-11α-hydroxyprogesterone in 1 ml. of pyridine and 0.1 of mesyl chloride is allowed to stand at 0° for 18 hours. The mixture is then diluted with water and the precipitated solid collected and washed well with water. The resulting 11α-mesylate (about 106 mg.) has a melting point about 203–205° (dec.);

$\lambda_{max.}^{Nujol}$ 5.86, 5.95, 7.56μ

EXAMPLE 20

9α-methyl-11-epihydrocortisone 11α,21-diacetate (XVI)

A solution of 18 mg. of 9α-methyl-11-epihydrocortisone in 0.5 ml. of anhydrous pyridine and 0.5 ml. of acetic anhydride is allowed to remain at room temperature for 18 hours. After removal of the reagents in vacuo the crystalline residue is recrystallized from acetone-hexane and furnishes the pure diacetate of the following properties: M.P. about 235–236°; [α]$_D^{23}$+142° (c. 0.38 in chlf.);

$\lambda_{max.}^{alc.}$ 241 mμ (ε=16,300); $\lambda_{max.}^{Nujol}$ 2.85, 2.91, 5.78, 5.95, 6.06, 6.20μ

*Analysis.*—Calcd. for C$_{26}$H$_{36}$O$_7$ (460.55): C, 67.80; H, 7.88. Found: C, 67.73; H, 7.91.

The invention may be otherwise variously embodied within the scope of the appended claims.

What is claimed is:

1. A compound selected from the group consisting of steroids of the general formulae

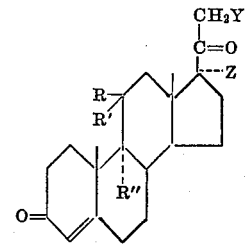

and

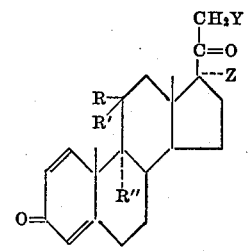

wherein R is hydrogen, R' is selected from the group consisting of α-hydroxy, α-acyloxy, and β-hydroxy, and together R and R' is keto, R'' is lower alkyl, Y is selected from the group consisting of hydrogen, hydroxy, and acyloxy, and Z is selected from the group consisting of hydrogen and α-hydroxy.

2. 9α-methyl-11-ketoprogesterone.
3. 9α-methyl-11-hydroxyprogesterone.
4. 9α-methyl-11β-hydroxyprogesterone.
5. 9α-methylcortisone.
6. 9α-methyl-Δ$^4$-pregnene-11,17α-diol-3,20-dione.
7. 9α-methylhydrocortisone.
8. 9α(lower alkyl)-cortisone 3,20-diketal.
9. 9α-methylcortisone 3,20-bis-ethylene ketal.
10. A process for preparing a 3,20-diketal of a 9α-(lower alkyl)-11-ketoprogesterone oxygenated in at least one of the positions 17α and 21, which comprises interacting the corresponding 3,20-diketal 9α-fluoro-11-ketoprogesterone derivative with a reagent selected from the group consisting of a lower alkyl magnesium halide and lithium lower alkyl, and recovering the 9α-lower alkyl steroid formed.

11. The process of claim 10 wherein the steroid reactant is 9α-fluorocortisone 3,20-bis-ethylene ketal.

12. A process for preparing a 3,20-diketal of 9α-(lower alkyl)-11-ketoprogesterone, which comprises interacting the corresponding 3,20-diketal of 9α-fluoro-11-ketoprogesterone with a lower alkyl magnesium halide and recovering the 9α-lower alkyl steroid formed.

13. A process for preparing a 3,20-diketal of a 9α-methyl-11-ketoprogesterone oxygenated in at least one of the positions 17α and 21, which comprises interacting the corresponding 3,20-diketal 9α-fluoro-11-ketoprogesterone derivative with methyl magnesium bromide, and recovering the 9α-methyl steroid formed.

14. A process for preparing a 3,20-diketal of a 9α-methyl-11-ketoprogesterone oxygenated in at least one of the positions 17α and 21, which comprises interacting the corresponding 3,20-diketal 9α-fluoro-11-ketoprogesterone derivative with lithium methyl, and recovering the 9α-methyl steroid formed.

15. A process for preparing a 3,20-diketal of 9α-methyl-11-ketoprogesterone, which comprises interacting the corresponding 3,20-diketal of 9α-fluoro-11-ketoprogesterone with methyl magnesium bromide, and recovering the 9α-methyl steroid formed.

16. A compound of the formula:

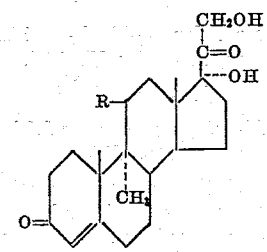

wherein R is selected from the group consisting of β-hydroxy and keto.

References Cited in the file of this patent

UNITED STATES PATENTS

| | | |
|---|---|---|
| 2,700,666 | Bernstein et al. | Jan. 25, 1955 |
| 2,756,179 | Fried et al. | July 24, 1956 |
| 2,767,199 | Djerassi et al. | Oct. 16, 1956 |
| 2,774,776 | Hogg et al. | Dec. 18, 1956 |
| 2,802,840 | Djerassi et al. | Aug. 13, 1957 |
| 2,802,841 | Spero | Aug. 13, 1957 |